INVENTOR
RUTH J. BALLAI
BY Arthur Jacobs
HER ATTORNEY

June 15, 1965 R. J. BALLAI 3,188,771
PLANT SUPPORT
Filed Sept. 9, 1963 2 Sheets-Sheet 2

INVENTOR
RUTH J. BALLAI
BY Arthur Jacob
HER ATTORNEY

United States Patent Office 3,188,771
Patented June 15, 1965

3,188,771
PLANT SUPPORT
Ruth J. Ballai, 287 Highland Ave., Somerset, N.J.
Filed Sept. 9, 1963, Ser. No. 307,664
1 Claim. (Cl. 47—47)

The present invention relates generally to plant supports and pertains, more specifically, to plant supports for use in supporting growing decorative house plants.

It has been the practice in growing various plants, such as flowers and vines, especially in the home, to provide a stake upon which the plant is supported as the plant grows. For aesthetic as well as practical reasons, it is desirable to employ a stake which extends lengthwise generally no further than the height of the plant itself. Inevitably, however, the plant height will change as the plant grows and, in order to maintain adequate support, it becomes necessary to extend the plant supporting stake to a greater length which usually requires the replacement of the original stake with one of greater length—at best, an inconvenient chore.

In maintaining a growing plant of the type described, it has been found advantageous to irrigate the plant and even provide nourishment along the length of the plant as well as at the base where the plant is rooted in the earth. The watering of ordinary stakes to accomplish such irrigation along the length of a plant has been found to be awkward and often not entirely effective. In addition, the water itself has been found to have adverse effects upon many of the materials now commonly employed in the fabrication of such stakes.

I have developed a device for supporting a growing plant, which device alleviates the difficulties encountered with conventional stakes and provides many advantages over such ordinary stakes. The device is comprised of a plurality of like elongated tubular members which are capable of being selectively assembled with one another to establish a plant support of desired length. Complementary means are provided in each member for cooperatively retaining assembled members in self-sustaining relationship so as to enable selective extension of the support to a desired length by the colligation of such like members and thus accommodate a plant as it grows along the support. Perforations are provided in each member for allowing the growing plant to be positively secured against the support. Additionally, I have found that a body of fibrous material may be placed within a perforated tubular member in a plant support to effect irrigation of the plant along its length through the perforations and allow the plant to become rooted in the fibrous material to positively secure the plant against the support.

It is therefore, a primary object of the invention to provide a support for a growing plant, the support being capable of selective extension to a desired length as the plant grows.

Another object of the invention is to provide a plant support capable of being selectively extended to a desired length without disturbing a plant which is already growing along the support.

Still another object of the invention is to provide a selectively extensible plant support which allows a growing plant to be positively secured against the support.

A further object of the invention is to provide a plant support which allows irrigation of a growing plant along the length of the plant.

A still further object of the invention is to provide a plant support which is relatively simple in design and construction and is readily fabricated of relatively inexpensive materials.

Additional objects and advantages will become apparent and the invention will be more fully understood in the following detailed description of an embodiment of the invention illustrated in the accompanying drawings in which.

Figure 1:
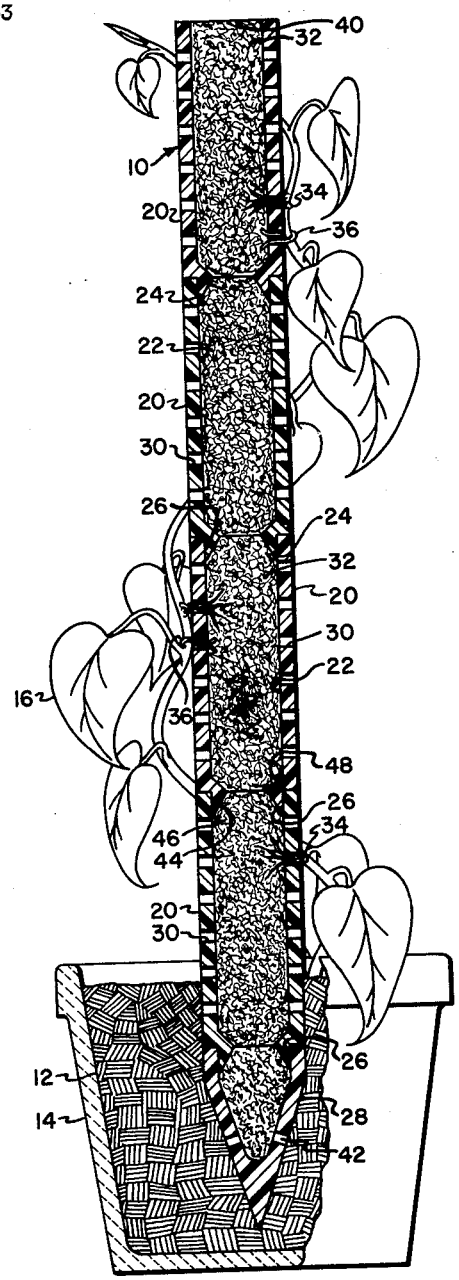
FIGURE 1 is a sectioned elevational view illustrating a plant support constructed in accordance with the invention and supporting a potted, growing plant.

Referring to the figures, and particularly to FIGURE 1, a plant support 10 is shown constructed in accordance with the invention and is anchored in earth 12 which is contained within a pot 14. A growing potted plant 16, which in the illustration is a philodendron plant, is rooted in the earth 12 and grows along the plant support 10.

In order to accommodate plants of various heights and allow for a selective extension of the plant support to a desired height, plant support 10 is made up of a plurality of elements in the form of elongated tubular members 20 which are capable of being joined together in self-sustaining relationship to establish a colligate device of any desired length. Each member 20 has a relatively thin wall 22 and, in order to allow the members to be readily colligated, a plug 24 is provided integral with the wall at one end of a member 20 and is capable of cooperatively engaging a socket 26 which is complementary to plug 24 and is integral with the other end of a member 20 so that like members 20 may be interfitted to establish the desired length.

The insertion of the plant support 10 into earth 12 is facilitated by a pointed spike member 28 which is also provided with a socket 26 so as to receive a tubular member 20 as shown.

Figures 2, 3:
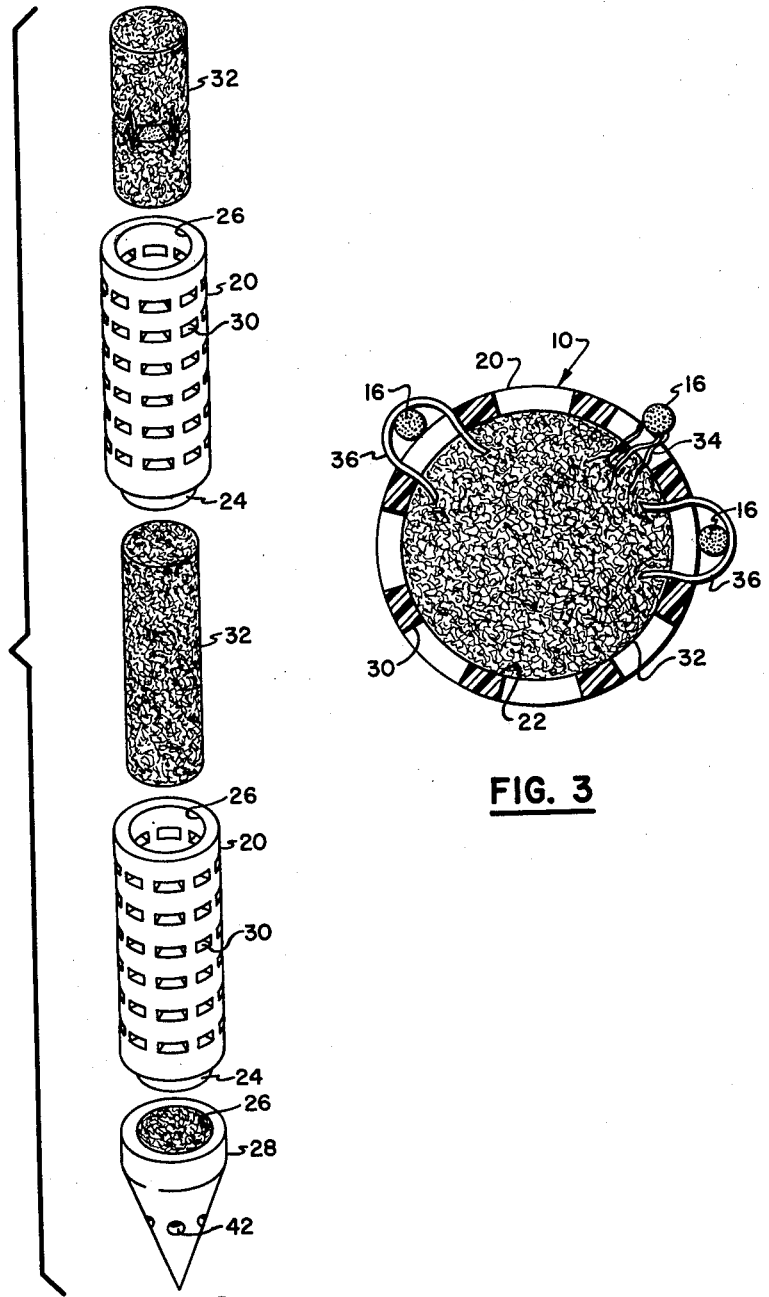
FIGURE 2 is an exploded perspective view of the plant support of FIGURE 1.
FIGURE 3 is an enlarged, typical cross-sectional plan view through the installed device of FIGURE 1.

As a plant grows along a support it is necessary to positively secure the plant to the support. To this end, perforations 30 extend through the wall 22 of each member 20 so that each member resembles a tubular grid, as best seen in FIGURE 2. A body of fibrous material 32 is received within the tubular members 20 and is contiguous with wall 22 such that the radicels 34 of the plant 16 can pass through the perforations and find a material which can be easily gripped by the natural tendency of the radicel to support the plant. As best seen in FIGURE 3, auxiliary support for the plant may be provided by the use of spring clips 36 which may be placed around the stalk of the plant 16 and inserted through perforations 30 to secure the plant to the plant support at points where no radicels grow. The legs of the spring clips are capable of elastic deflection toward one another to allow the insertion of a clip 36 into a perforation and then spring outwardly away from one another to grip the wall 22 at the edges of the perforation and retain the clip within the perforation. Additionally, the legs of the clips are pointed so that the clips may penetrate the fibrous material 32 with ease.

Water can be poured into the plant support at the open top 40 and will seep through the fibrous material 32 to keep the material moist and allow irrigation of the plant along the entire length of the plant and plant support. Various fertilizers and plant foods may be incorporated into the fibrous material or mixed with the water to provide nourishment for the plant not only at the radicels, but also at the main root of the plant in the earth by virtue of the water carrying such nourishment through apertures 42 provided in the spike member 28 to the root.

The tubular members 20, as well as spiked member 28, are each fabricated in one piece and are preferably molded of a synthetic resin which is relatively inexpensive, yet structurally strong and impervious to water and other elements which will come into contact with the plant support during its useful life. In addition, such resins may be molded into a wide variety of aesthetically pleasing shapes and colors and can even be made to resemble natural plants, logs and like appropriate objects. The fibrous material 32 is preferably supplied in the form of rods of compacted material, usually compacted peat moss, having external dimensions generally the same as the internal dimensions of each tubular member 20.

As the plant grows it is only necessary to add another member 20 to the top of the plant support and insert a rod of fibrous material to extend the plant support to the desired length without requiring removal of the entire support and replacement with a longer support. Thus, the plant itself need never be disturbed. The relative dimensions of each plug 24 and socket 26 are such that they may be interfitted to maintain assembled members 20 in self-sustaining relationship. In order to facilitate the insertion of a plug 24 into a socket 26 when a rod of compacted material is already lying within a member 20 whose socket is to be penetrated, each plug is tapered at 44 to form a sharp edge at 46 so that the fibrous material is easily displaced as the members 20 are assembled. In a similar manner tapered portions 48 assure that the rods of fibrous material will be moved downwardly as seen in FIGURE 1 to a point where each added rod will become contiguous with the next lower rod of fibrous material during assembly of the device.

It will be apparent that the plant support of the invention can be selectively extended to any desired length to support a plant as it grows without disturbing the plant. Irrigation of the plant along its length is readily accomplished, as well as irrigation and nourishment of the plant as a whole.

It is to be understood that the above detailed description of an embodiment of the invention is provided by way of example only and is not intended to limit the invention. Various details of design and construction may be modified without departing from the true spirit and scope of the invention as set forth in the appended claim.

I claim:

A colligate plant support for use in supporting a growing plant, the plant support comprising:

(A) a plurality of contiguous elongated tubular members of synthetic resign material, each member having a relatively thin axially extending wall with a sleek external surface, an internal surface and first and second ends;
(B) a socket integral with each first end;
(C) a plug integral with each second end, the plugs and sockets being complementary for engagement of the plugs and sockets of contiguous members in self-sustaining relationship to retain each member colligated with a contiguous member and allow the support to be selectively extended to any desired length by the colligation of additional members to accommodate the plant as it grows along the external surface of the support;
(D) perforations extending radially through the wall of each member for allowing the growing plant to be positively secured against the external surface of the support; and
(E) a body of fibrous material having a configuration complementary to the internal surface of a member and received within the wall of the member such that the plant may be irrigated along its length through the perforations and become rooted in the fibrous material to positively secure the plant against the external surface of the support.

References Cited by the Examiner

UNITED STATES PATENTS

| | | | |
|---|---|---|---|
| 122,952 | 1/72 | McDonald et al. | |
| 291,569 | 1/84 | Borner | 47—47 |
| 2,964,877 | 12/60 | Gauding | 47—47 X |
| 3,007,282 | 11/61 | Galesky | 47—41 |
| 3,063,196 | 11/62 | Pauer | 47—38 |

FOREIGN PATENTS

| | | |
|---|---|---|
| 202,146 | 9/08 | Germany. |
| 342,400 | 12/59 | Switzerland. |

ABRAHAM G. STONE, *Primary Examiner.*

T. GRAHAM CRAVER, WILLIAM A. SMITH III,
*Examiners.*